United States Patent [19]

Stotts et al.

[11] 4,125,316
[45] Nov. 14, 1978

[54] INTEGRATED OPTICAL MATRIX MULTIPLIER

[75] Inventors: Larry B. Stotts, Chula Vista; Paul S. Catano, San Diego, both of Calif.

[73] Assignee: The United States of America as represented by the Secretary of the Navy, Washington, D.C.

[21] Appl. No.: 799,809

[22] Filed: May 23, 1977

[51] Int. Cl.$^2$ ............................................... G02B 5/14
[52] U.S. Cl. ............................. 350/96.13; 350/96.14; 350/159; 350/353
[58] Field of Search ................... 350/96.14, 96.13, 159, 350/353; 250/225

[56] References Cited

U.S. PATENT DOCUMENTS

| | | | |
|---|---|---|---|
| 3,781,081 | 12/1973 | Rokos | 350/96.14 |
| 3,944,820 | 3/1976 | Stotts | 350/96.14 |
| 3,995,311 | 11/1976 | Taylor | 350/96.14 |

*Primary Examiner*—John K. Corbin
*Assistant Examiner*—Stewart Levy
*Attorney, Agent, or Firm*—R. S. Sciascia; G. J. Rubens; J. W. McLaren

[57] ABSTRACT

An optical waveguide of photoconductive material is positioned parallel to at least one other optical waveguide of electrooptical material. A first electrode is positioned between the two optical waveguides and second and third electrodes are positioned contiguous to the optical waveguides and opposite the first electrode. A constant amplitude electrical source is connected to the second and third electrodes and when light energy signals representative of a column vector function are propagated along the photoconductive optical waveguide, a commensurate change of conductivity between the first and second electrodes is caused to occur with a consequent change in electrical potential across the second and third electrodes embracing the optical waveguide of electrooptic material. When light energy signals representative of a row vector function are propagated along the second optical waveguide, a polarizatin modulated output signal is developed by the second optical waveguide. A polarization analyzer of the filter or polarization discriminator type intercepts the polarization modulated output light signals of the second optical waveguide and an integrating storage detector responds to the output light signals for generating commensurate electrical signals which are representative of the multiplication of the column vector function and the row vector function as represented by the light energy signals propagating along the photoconductive optical waveguide and the electrooptical waveguide, respectively. By adding several electrooptical waveguide, analyzer, and detector sections in electrical parallel to the first electrooptical subsystem, the row-column vector multiplier is made to function as a matrix vector multiplier.

9 Claims, 5 Drawing Figures

INTEGRATED OPTICAL MATRIX MULTIPLIER

BACKGROUND OF THE INVENTION

Matrix multiplication of complex signal information can be most useful in analysis and correlation for the extraction of further desired signal information. However, prior art and present methods and techniques for performing matrix multiplication are in the main part exclusively electronic in nature or heavily dependent upon electronic techniques. As a result, the equipments embodying such prior art and present techniques of matrix multiplication are generally inclined to be expensive, bulky, and in many cases limited as to the types of input signals which are acceptable for such matrix multiplication. Moreover, the processing speeds at which such matrix multiplication is accomplished in prior art and presently available equipments is constrained by the operative speeds of electronic components.

In the recent prior art and the current state of the art a number of optical processors for performing matrix multiplication have been proposed employing both coherent and incoherent light for their operation. Unfortunately, however, such currently known optical processes for performing matrix multiplication have many inherent disadvantages which include the problems of size, cost, speed of operation, mechanical stability, and optical alignment which severely hinder their practical implementation and use.

Accordingly, a new method and technique for performing matrix multiplication in real time through the use of integrated optical and electrooptical technologies is highly desirable. Moreover, it is required that such electrooptical matrix multiplication equipment be significantly less complex in its concept than prior art matrix multiplication equipments employing electronic techniques and, also, that an improved matrix multiplication equipment be more compact, less expensive, and, in general, free from the troublesome inherent problems associated with many of the prior art and present state of the art matrix multiplication processors.

SUMMARY OF THE INVENTION

The performance of row-column multiplication requires non-linear interaction between two signal information carriers. The present invention contemplates such interaction between two or more intensity modulated light beams propagating along a number of dielectric waveguides.

Inherent in the concept of the present invention is that one such dielectric waveguide be comprised of photoconductive material, i.e., a suitable material which will desirably change its electric conductivity responsive to the instantaneous change in the amount of light intensity propagated along its path. Electrodes are positioned on each side of such optical waveguide of photoconductive material and additional optical waveguides in any desired number are disposed substantially parallel to the first photoconductive optical waveguide with pairs of electrodes disposed on opposite sides.

A source of constant amplitude dc potential is connected to one of the electrodes contiguous to the photoconductive optical waveguide and, in the absence of any light signal information propagated along the photoconductive optical waveguide, a maximum resistance or impedance exists between the electrode connected to the constant amplitude dc potential and the electrode immediately on the opposite side of the photoconductive optical waveguide. Upon an intensity modulated light energy signal propagating along the path of the photoconductive waveguide, the conductivity between the electrode connected to the constant amplitude dc potential and the electrode on the opposite side of the photoconductive optical waveguide is commensurately changed in accordance with the instantaneous intensity of such light signal information.

The electrode opposite to the source of constant amplitude dc potential is interconnected to similarly disposed electrodes positioned on opposite sides of the one or more electrooptical waveguides employed in the processor of the present invention. When electrical signal information is propagated along one or more of the electrooptical waveguides thus situated, a multiplication process takes place in response to interaction between the signal information being propagated along the photoconductive optical waveguide and the signal information being propagated along one or more of the electrooptical waveguides.

In its simplest form the present invention may comprise a row-column vector multiplier employing one optical waveguide defined by photoconductive material and a second optical waveguide defined by electrooptic material. Operating in the manner described hereinbefore, the output of the electrooptic waveguide will be light signals which are polarization modulated in accordance with the row-column multiplication of the previously described two input signals to the two optical waveguides. A polarization analyzer, of the filter or polarization discrimination type, is positioned to intercept the output signals and a suitable integrating storage detector, which is responsive to the output light signals, generates commensurate electrical signals representative of the multiplication of the column vector function and the row vector function of the respective input signal information into the photoconductive optical waveguide and the electrooptic waveguide.

In accordance with the concept of the present invention the row-column vector multiplier is preferably fabricated on a common supporting substrate. Accordingly, the first optical waveguide may be defined by a linear path of photoconductive material in a supporting substrate, while a second optical waveguide may be defined by a linear path of electrooptic material in the same supporting substrate and in spaced parallel disposition relative to the first optical waveguide.

The first electrode, comprised of suitable electrically conductive material, is supported on the substrate between the first and second optical waveguides; second and third electrodes comprised of similar electrically conductive material are supported on the substrate contiguous to the first and second optical waveguides and opposite the first electrode. A constant amplitude dc electrical source is connected across the second and third electrodes.

When a first coherent source of light is intensity modulated in accordance with a column vector function and propagated along the first optical waveguide, it causes commensurate changes in conductivity between the first and second electrodes with a resultant change of dc potential across the second and third electrodes. Further, when a second coherent source of light is intensity modulated in accordance with a row-vector function and propagated along the second optical waveguide, it is acted upon by the change in potential across the electrooptic material of the second optical waveguide thereby producing in the second optical waveguide polarization modulated signals which are representative of the desired row-column vector multiplication.

A polarization analyzer of the filter or polarization discriminator type intercepts the polarization modulated output light signals from the second optical waveguide and a suitable integrating storage detector responds to the output light signals for generating commensurate electrical signals representative of the multiplication of the column-vector function and the row vector functions of the light energy signals impressed upon and propagated along the first and second optical waveguides, respectively.

The described row-column vector multiplier, comprised of two optical waveguides, may be extended within the concept of the present invention to a matrix-vector multiplier by adding several electrooptical waveguide sections with their associated analyzer and detector portions. A similar electrode structure disposed on opposite sides of the additional electrooptic waveguides is connected in electrical parallel with the first electrooptic waveguide previously described. The intensity modulated light energy signal information propagating along each off the additional electrooptic waveguide sections is representative of a row of a linear matrix operator and the resultant output is the matrix-vector multiplication of such plurality of functions.

Accordingly, it is a primary object of the present invention to provide an improved method of matrix-vector multiplication which is operative in real time.

Another most important object of the present invention is to provide an optical matrix-vector multiplication processor which may be fabricated by integrated optical and electrooptical technology.

An ancillary object of the present invention is to provide a new concept for optical matrix-vector multiplication which incorporates row-vector multiplication.

A further object of the present invention is to provide such row-vector and matrix-vector multiplication in a processor which is simpler, more compact, and less expensive than known prior art processors designed for comparable operative results.

Yet another object of the present invention is to provide such row-vector multiplication and matrix-vector multiplication processors which both improve the processing speed of operation and expand the types of input signals that may be employed.

An additional object of the present invention is to provide such row-vector multiplication processors and matrix-vector multiplication processors which have the advantages of smaller size, high speed operation, and significantly improved mechanical stability, without the requirement for extraordinarily stringent optical alignment beyond the capabilities of the present state of the art.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

The present invention contemplates an integrated optical matrix multiplier which comprises a linear array of subsystems performing row-column vector multiplication through the interaction of electrooptic and photoconductive phenomena in semiconducting materials in two optical waveguides which receive coherent light energy signals representative of row-vector function and column-vector functions, respectively. Suitable filters, polarization analyzers or polarization discriminating means, are used together with integrating storage detectors which produce the final output signal information in the form of either a row-column vector multiplication or a matrix-column vector multiplication.

Accordingly, the concept of the present invention employs photoconductivity, electrooptical phenomena, and integrated optical technology to perform the matrix multiplication which may be represented as, $$c_m = \sum_{r=1}^{N} a_{mn}b_n, m = 1, 2, \ldots M. \tag{1}$$

The elements $a_{mn}$ constitute an M × N matrix (A), whereas the elements $b_n$ and $c_m$ represent an N × 1 column vector (B) and an M × 1 column vector (C), respectively. Although limited to processing real-positive input vectors, the processor of the present invention is well suited for many signal processing applications involving a number of different types of linear transformations such as the Walsh-Hadamard and Fourier transforms, filtering functions, and/or combinations of such functions as may be desired. Typically the input signal may be originated from radar returns, brain wave activity, cardiovascular activity or acoustical signals, though the concept of the present invention is not limited to such signals.

The integrated optical matrix multiplier of the present invention is a linear array of subsystems which are inherent in the concept of the present invention and perform a row-column vector multiplication using the electrooptic and photoconductive phenomena in semiconducting materials defining two optical waveguides, together with integrating storage detectors.

Figure 2:
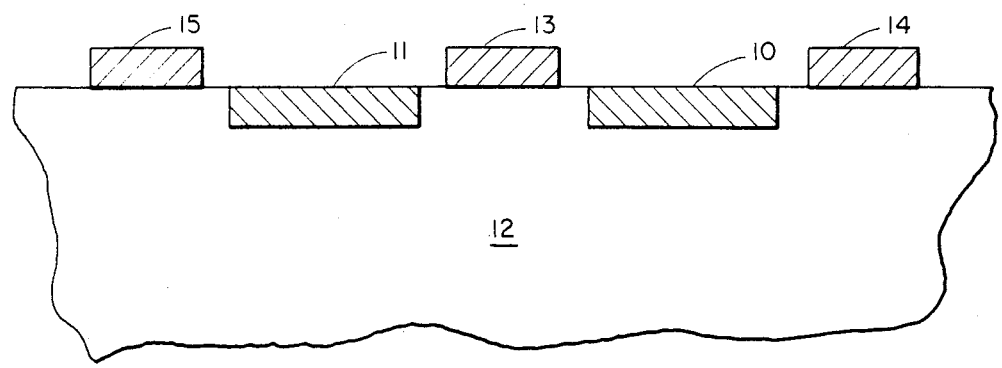
FIG. 2 is a cross-sectional view of an integrated embodiment of the present invention on a common substrate.
Figure 1:
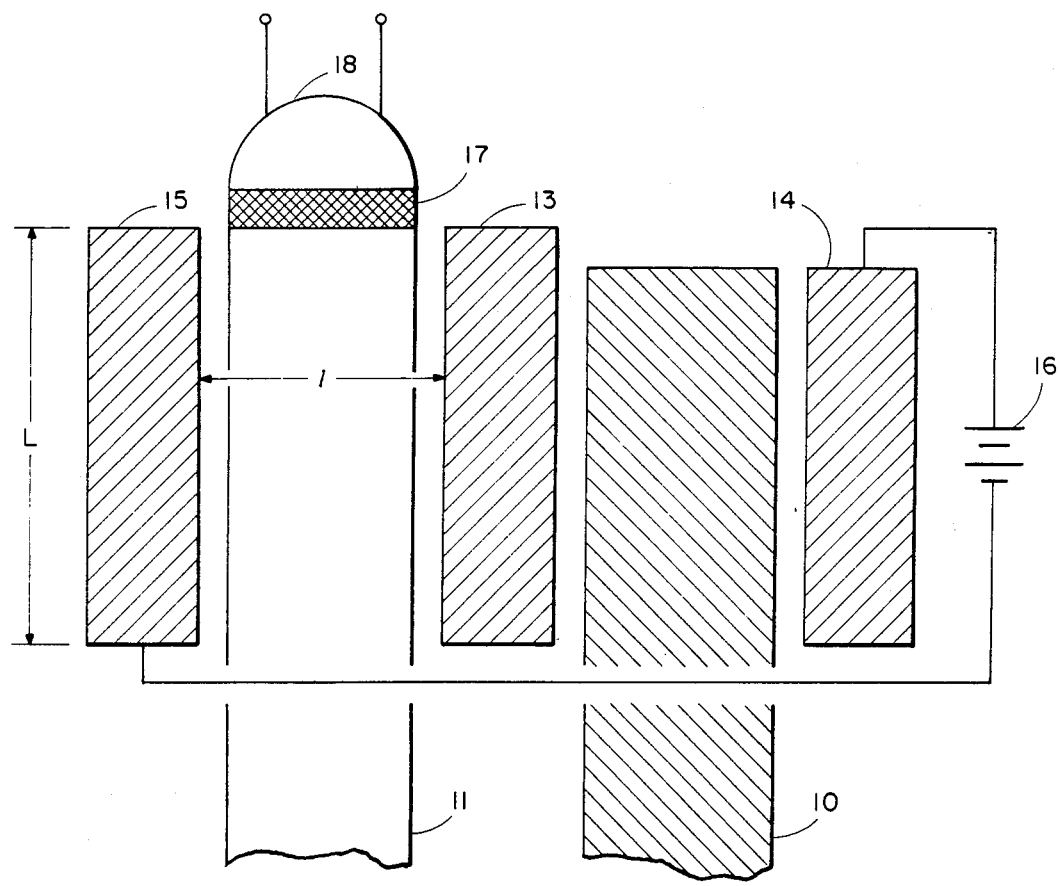
FIG. 1 is a top view of one embodiment of the present invention.

FIGS. 1 and 2 are top and cross-sectional views, respectively, of one configuration for the row-column vector multiplier as conceived by the present invention. Two optical waveguides 10 and 11 are produced in a common integrated host substrate material 12 such as by, for instance, diffusing a suitable amount of Se into CdS host substrate material. The first optical waveguide 10 is designed and fabricated for high optical absorption, large dark resistivity, and a large photoconductive effect, whereas the second waveguide 11 is designed and fabricated to possess low optical absorption, relatively high resistivity, and minimal conductivity.

Accordingly, optical waveguide 10 will undergo a change in its electrical resistivity in response to the intensity of light energy propagated along its path. By contrast, the second optical waveguide 11 will undergo changes causing changes in the polarization orientation of light propagated along its path in response to changes an electric field impressed across the optical path defined by the second optical waveguide 11.

A first electrode 13 composed of an electrically conductive material such as deposited aluminum, for example, is supported on the substrate 12 between the first optical waveguide 10 and the second optical waveguide 11. Second and third electrodes 14 and 15 comprised of similarly deposited electrically conductive material are also supported on the substrate 12 contiguous to the first and second optical waveguides 10 and 11, respectively. A constant amplitude dc electrical source such as the battery 16 is connected to the second and third electrodes 14 and 15.

Accordingly, the degree of photoconductivity induced by light energy signals propagated along the first optical waveguide 10 will cause a change in voltage drop from the electrodes 14 to 13, with a commensurate change in dc potential across the electrodes 13 and 15 which, in turn, will operate upon light energy propagated along the optical waveguide 11 to change its character such as changing its polarization, for example. Such change of polarization can be detected as the output of the optical waveguide 11 using a polarization analyzer 17, which may be of the polarization filter or polarization discriminator type, and a suitable integrating storage detector 18 which take the form of a photoresponsive charge coupled device, for example, such as are currently available in many operation configurations.

Thus, if the second optical waveguide 11 is a linear electrooptic device and the signals propagated along the first and second optical waveguides 10 and 11 are binary in nature, such that when light is present a binary "1" is represented, and when light is not present a binary "0" is represented, the binary row-column vector multiplier function is achieved.

In the embodiment of FIG. 1 a dc potential drop is developed across each of the waveguides 10 and 11. The potential drop across the first waveguide 10 may be designated as $V_{EO}$ and the potential drop across the second optical waveguide 11 may be designated as $V_{PC}$. The orientation of the polarization analyzer 17 or polarization discriminator at the end of the second optical waveguide 11 is such that the output signal from the second optical waveguide 11 is blocked and hence does not reach the storage detector. If light energy signals of a binary nature are simultaneously propagated along both the first optical waveguide 10 and the second optical waveguide 11, the effective resistivity of the first optical waveguide 10 will be appreciably lower and the light energy signal propagated along the second optical waveguide 11 will receive an additional phase retardation along the slow axis which may be mathematically represented as, $$\Delta\phi = \frac{\pi}{\lambda} \frac{n^3 r L}{\iota} [V_{EO}^* - V_{EO}] \qquad (2)$$

where $V_{EO}^*$ = new voltage across the E/O guide,
$\lambda$ = wavelength of light,
$n$ = refractive index of the waveguide,
$L$ = length of the electrodes, and
$\iota$ = electrode spacing Thus, if $V_{EO}^*$ is of sufficient magnitude, the resulting change in polarization permits the polarization analyzer 17 to pass all of its output light energy from the second optical waveguide 11 to the integrating storage detector 18. Accordingly, it is apparent that if light is present in only one of the waveguides 10 or 11, or not present at all in either of the optical waveguides, the integrating storage detector will record a binary "0" for that time interval. Only when a signal is present in both optical waveguides 10 and 11 simultaneously will the integrating storage detector 18 read a binary "1."

Therefore, if a train of binary "zeros" and binary "ones" are propagated down each of the optical waveguides 10 and 11 simultaneously such as, for example, $(a_j; j = 1,2,\ldots N)$ in the first optical waveguide 10 and $(b_j; j = 1,2\ldots N)$ in the second optical waveguide 11, the resulting signal produced at the integrating storage detector 18 is the composite integration of their respective multiplication. Mathematically this could be expressed as, $$\sum_{j=1}^{N} a_j b_j \qquad (3)$$

The row-column vector multiplier described in the foregoing explanation may, within the concept and teaching of the present invention, be readily extended to a matrix-vector multiplier by adding additional electrooptic waveguide/analyzer/detector sections in electrical parallel with the first subsystem for row-column vector multiplier. Such a matrix vector multiplier is illustrated in the embodiment shown in FIG. 3.

A first optical waveguide 20 is defined by a linear path of photoconductive material in a suitable supporting substrate. First and second electrodes 21 and 22, comprised of electrically conductive material, are supported on the same substrate on opposite sides of the first optical waveguide 20 and in contiguous parallel relationship thereto. A constant amplitude dc potential, such as the battery 23, is connected to the first electrode 21.

A plurality of additional optical waveguides 24, 25, and 26 are defined by multiple linear paths of electrooptic material disposed in the supporting substrate in spaced parallel relation to the first optical waveguide 20. A plurality of pairs of electrodes 27 and 28, 29 and 30, 31 and 32, comprised of electrically conductive material supported on the same substrate, are disposed so that each pair is spaced in parallel disposition on opposite sides of one of the additional optical waveguides 24, 25, and 26 of electrooptical material.

One of each of the pairs of electrodes is connected to the second electrode 22, while the other of each pair of electrodes is grounded. A source of coherent light signals intensity modulated in accordance with a column vector function is propagated along the first optical waveguide 20 and may be mathematically represented as, $$\{b_j; j = 1,2,3,\ldots N\} \qquad (4)$$

A plurality of sources of coherent light signals, each of which is intensity modulated in accordance with a row function of a linear matrix operator, is propagated along a respective one of the plurality of additional optical waveguides 24, 25, and 26.

The coherent light signals intensity modulated in accordance with a row function of a linear matrix operator and propagated along optical waveguide 24 may be mathematically represented as, $$\{a_{1j}; j = 1,2,3, \ldots N\} \tag{5}$$

producing an output $$C_1 = \sum_{j=1}^{N} a_{1j} \cdot b_j. \tag{6}$$

Similarly, the coherent light signals intensity modulated in accordance with a second row function of a linear matrix operator and propagated along the electrooptic waveguide 25 may be mathematically represented as, $$a_{2j}; j = 1,2,3, \ldots N \tag{7}$$

producing an output $$C_2 = \sum_{j=1}^{N} a_{2j} \cdot b_j. \tag{8}$$

Finally, the source of coherent light signals intensity modulated in accordance with a third row function of a linear matrix operator and propagated along the electrooptic waveguide 26 may be mathematically represented as, $$\{a_{3j}; j = 1,2,3 \ldots N\} \tag{9}$$

producing an output $$C_3 = \sum_{j=1}^{N} a_{3j} \cdot b_j. \tag{10}$$

Figure 3:
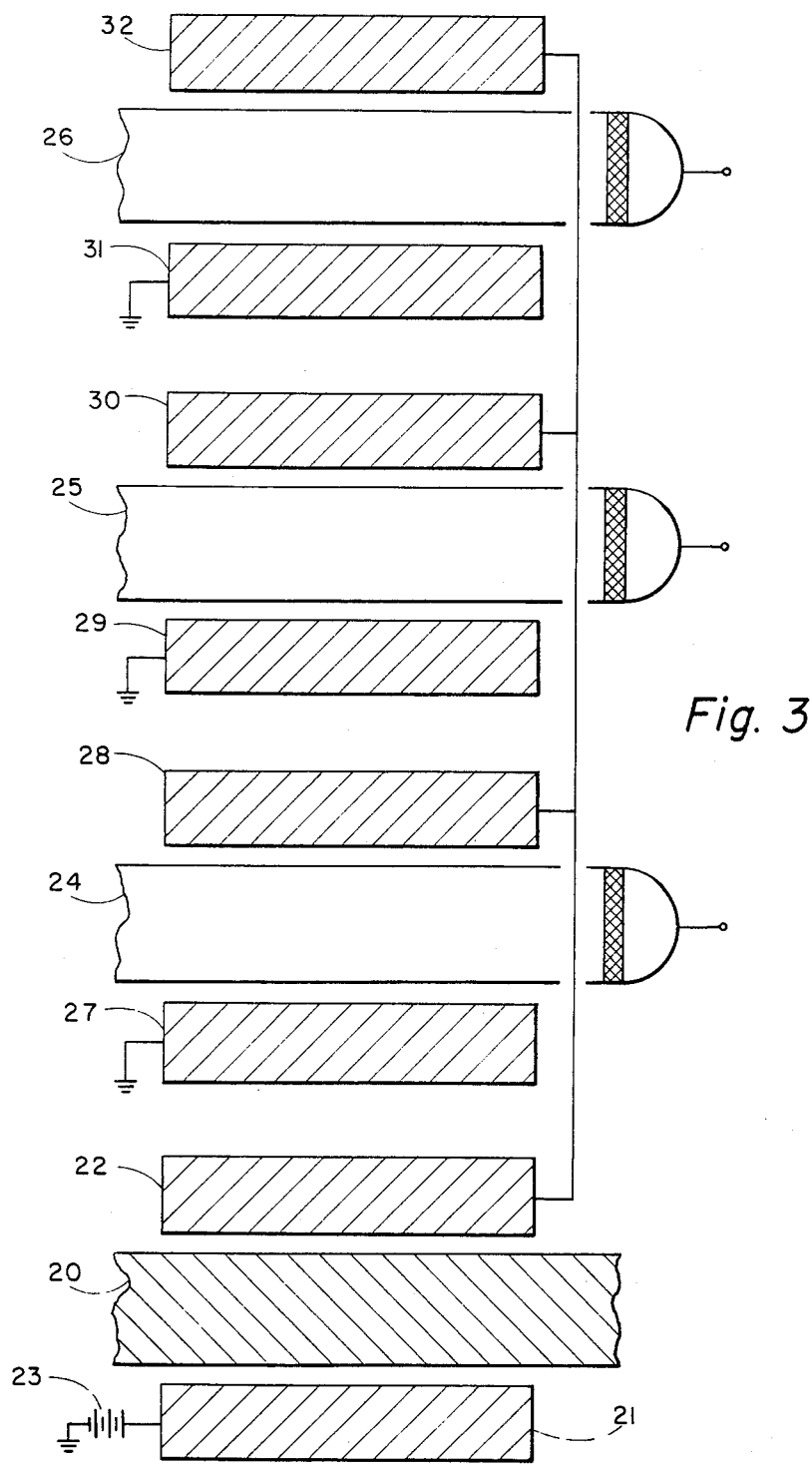
FIG. 3 is a top view of the concept of the present invention embodied in a matrix-vector multiplier configuration.

Thus, the embodiment of the present invention as illustrated in FIG. 3 will function as a [3 × N] matrix multiplier which may be expressed as, $$C_m = \sum_{j=1}^{N} a_{m,n} b_n, \ m = 1,2,3 \tag{11}$$

in conformance with equation (1) previously set out in explanation of the concept and operation of the present invention.

Relating the structure of the embodiment illustrated in FIG. 3 to equation (1), it may be seen that the resulting output from the multiple detector array would be the column vector (C) = ($C_m$; $m$ = 1,2,3, ... M), the input of the photoconductive optical waveguide 20 would be the vector (B) = ($b_n$; $n$ = 1,2,3, ... N) and the signal train of light energy amplitude modulation in each of the additional waveguides 24, 25, and 26 would be a row of the linear matrix operator (A). The values of M and N would depend on the materials employed and the particular configuration chosen for this structure, the dynamic range of the detectors, and the particular type of input signals. This latter type of parameter is to be particularly noted since the concept of the present invention enables it to be operative on analog as well as digital signals.

The concept and operation of the present invention may perhaps be better understood from a description of one embodiment for a matrix-vector multiplier fabricated in a CdS substrate by a single dopant diffusion. Several oriented pieces of CdS, purchased from a commercial source were initially mechanically published. The substrates were final polished in ½% bromine and methanol to remove surface damage and then covered with 500A of $SiO_2$. A diffusant mask was then formed in this layer using conventional photolithography and chemical etching.

The mask consisted of an array of 18-μm wide lines with 15-μm spaces. The substrates were then diffused with selenium to form $CdS_{1-x}Se_x$ waveguides. The mole fraction X chosen for this embodiment was 0.105. After removal of diffusion masks, a new layer of $SiO_2$(~1000A) was deposited on the surface, and the appropriate aluminum electrode pattern fabricated on top. The substrates were then cleaved.

Optical evaluation of these embodiments was carried out by double end-firing the cleaved substrates and using conventional modulation evaluation techniques such as disclosed in a publication by A. Yariv entitled "INTRODUCTION TO OPTICAL ELECTRONICS" published by Holt, Rinehart and Winston in San Francisco in 1971 and a publication of R. S. Longhurst entitled "GEOMETRICAL AND PHYSICAL OPTICS" published by Longman Group, London, 1970.

Figure 4:
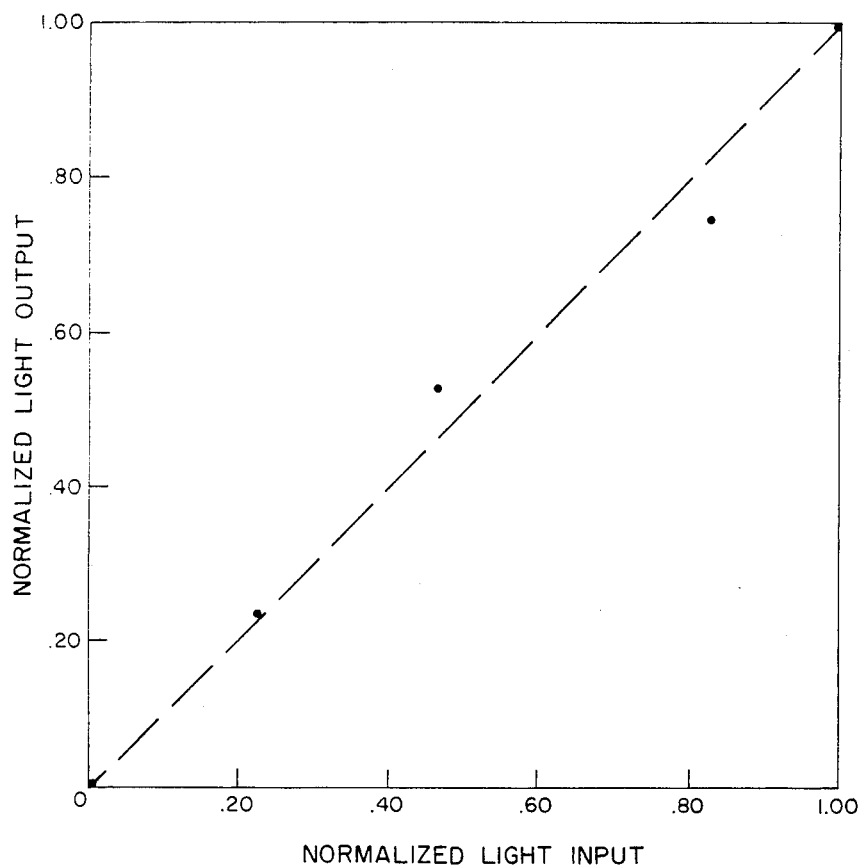
FIG. 4 is the graphical illustration of normalized light output vs. normalized light input for a constant amplitude signal train in an electrooptic waveguide such as may be used in the present invention; and, FIG. 5 is a graphical illustration of the normalized resistance change as a function of normalized input for a photoconductive optical waveguide such as may be used in the present invention.
Figure 5:
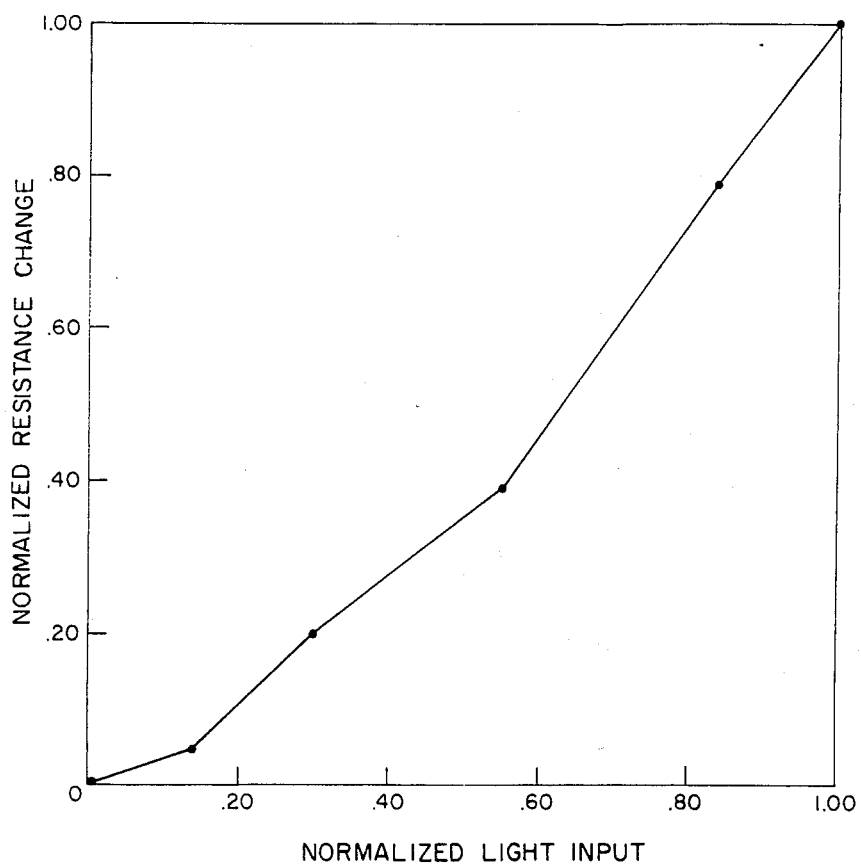

FIGS. 4 and 5 illustrate representative characteristic results from the evaluation of several row-column vector multiplier embodiments of the present invention fabricated as described hereinbefore. FIG. 4 is a graphic illustration of the characteristic normalized light output vs. normalized light input for a constant signal train in the electrooptic waveguide. FIG. 5 is a graphic illustration of the normalized resistance change as a function of normalized input for a photoconductive waveguide with a fixed load. The waveguide dimensions in this particular embodiment of the present invention were 24μm × 4.95μm × 0.317cm and it is evident that good linear response can be obtained.

Those skilled and knowledgeable in the pertinent arts will fully appreciate that the concept of the present invention is such that its fabrication renders it vibration insensitive and additionally its embodiments do not suffer from stringent alignment problems either of an optical or mechanical nature since the source of light energy, waveguides, modulator, photoconductive material, polarization analyzer, and detector are fixed in position in abutted alignment. Moreover, due to the small size of the elements employed in the present invention and the type of non-linear interaction, the power requirement of embodiments of the present invention are desirably low.

Additionally, the potential processing speeds which may be achieved in the operation of the present invention are limited only by the photoconductive and electrooptic responses of the particular materials used in its fabrication.

Furthermore, as previously explained, the present invention is so conceived that it has the ability to perform analog as well as digital processing and the rows of the matrix may be continuous as well as the input signal.

An alternative embodiment of the present invention may involve replacing the electrooptic waveguide and polarization analyzer by a binary switch type of arrangement composed of two parallel electrooptic waveguides, the basic principle of operation of which is disclosed in U.S. Pat. No. 3,909,108, issued to Henry F. Taylor, Sept. 30, 1975. As disclosed in that patent, in the presence of a suitably applied potential, the optical waveguides are non-synchronous and the light energy signals tend to remain in the initially excited optical waveguide. In the presence of a suitably applied potential, however, the optical waveguides become synchronous and the light energy signals are transferred to the second optical waveguide which is connected to the detector.

Other alternatives and substitutions include the use of material exhibiting quadratic rather than linear electrooptic effect as well as employing a pyroelectric detector directly coupled to an electrooptic modulator without an external potential source being utilized.

Obviously many modifications and variations of the present invention are possible in the light of the above teachings. It is therefore to be understood that within the scope of the appended claims the invention may be practiced otherwise than as specifically described.

What is claimed is:

1. An integrated optical row-column vector multiplier comprising:
    a first optical waveguide defined by a linear path of photoconductive material in a supporting substrate;
    a second optical waveguide defined by a linear path of electrooptic material in said supporting substrate and in spaced parallel disposition relative to said first optical waveguide;
    a first electrode comprised of electrically conductive material supported on said substrate between said first and second optical waveguides;
    second and third electrodes comprised of electrically conductive material supported on said substrate contiguous to said first and second optical waveguides and opposite said first electrode;
    a constant amplitude d.c. electrical source connected to said second and third electrodes;
    a first coherent source of light signal intensity modulated in accordance with a column vector function and propagated along said first optical waveguide;
    a second coherent source of light signals intensity modulated in accordance with a row vector function and propagated along said second optical waveguide;
    a polarization analyzer positioned to intercept the output light signals of said second optical waveguide; and
    an integrating storage detector responsive to said output light signals for generating commensurate electrical signals representative of the multiplication of said column vector function and said row vector function.

2. An integrated optical row-column vector multiplier as claimed in claim 1 wherein said light signals are modulated in an analog mode.

3. An integrated optical row-column vector multiplier as claimed in claim 1 wherein said light signals are modulated in a binary mode.

4. An integrated optical row-column vector multiplier as claimed in claim 1 wherein said substrate is fabricated of cadmium sulfide.

5. An integrated optical row-column vector multiplier as claimed in claim 4 wherein said substrate is diffused with selenium to form optical waveguides.

6. An integrated optical row-column vector multiplier as claimed in claim 1 wherein said electrodes are comprised of aluminum deposited on the surface of said substrate.

7. An integrated row-column vector multiplier as claimed in claim 1 wherein said first optical waveguide is fabricated of sulfur-compensated cadmium sulfide diffused with selenium.

8. An integrated optical row-column vector multiplier as claimed in claim 1 wherein said second optical waveguide is fabricated of cadmium-compensated cadmium sulfide diffused with selenium.

9. An integrated optical matrix-vector multiplier comprising:
    a first optical waveguide defined by a linear path of photoconductive material in a supporting substrate;
    first and second electrodes comprised of electrically conductive material supported on said substrate on opposite sides of said first optical waveguide and in contiguous parallel relationship thereto;
    a constant amplitude dc potential connected to said first electrode;
    a plurality of additional optical waveguides defined by multiple linear paths of electrooptic material disposed in said supporting substrate in spaced parallel relation to said first optical waveguide;
    a plurality of pairs of electrodes comprised of electrically conductive material supported on said substrate, each pair being spaced in parallel disposition on opposite sides of one of said additional optical waveguides, one of each of said pairs of electrodes being connected to said second electrode and the other being grounded;
    a source of coherent light signals intensity modulated in accordance with a column vector function and propagated along said first optical waveguide;
    a plurality of sources of coherent light signals, each intensity modulated in accordance with a row function of a linear matrix operator and propagated along a respective one of said plurality of additional optical waveguides;
    a polarization analyzer positioned to intercept the output light signals of each of said plurality of additional optical waveguides; and
    an integrating storage detector responsive to the output light signals of each of said additional optical waveguides for generating commensurate electrical signals representative of the matrix-vector multiplication of the input modulated light signals.

* * * * *